H. CORY & E. P. DANDRIDGE.
CONVEYER.
APPLICATION FILED OCT. 5, 1908.

933,365.

Patented Sept. 7, 1909.

Witnesses:

Inventors:
Harvey Cory
Edmund P. Dandridge

UNITED STATES PATENT OFFICE.

HARVEY CORY AND EDMUND P. DANDRIDGE, OF PITTSBURG, PENNSYLVANIA.

CONVEYER.

933,365.  Specification of Letters Patent.  Patented Sept. 7, 1909.

Application filed October 5, 1908. Serial No. 456,113.

*To all whom it may concern:*

Be it known that we, HARVEY CORY and EDMUND P. DANDRIDGE, citizens of the United States, residing at Pittsburg, in the county of Allegheny and State of Pennsylvania, have invented certain new and useful Improvements in Conveyers, of which the following is a specification, reference being had therein to the accompanying drawing.
Our invention refers to improvements in flexible conveyers, and is particularly designed for the purpose of providing means for conveying hot material as slag, coke, cinders, etc., and consists of an endless carrier or belt having a base mounted on supporting or driving pulleys or drums and provided with a sectional facing of fireproof material, so constructed and combined with the base that it will conform to the various deflections thereof in use.

Figure 1:
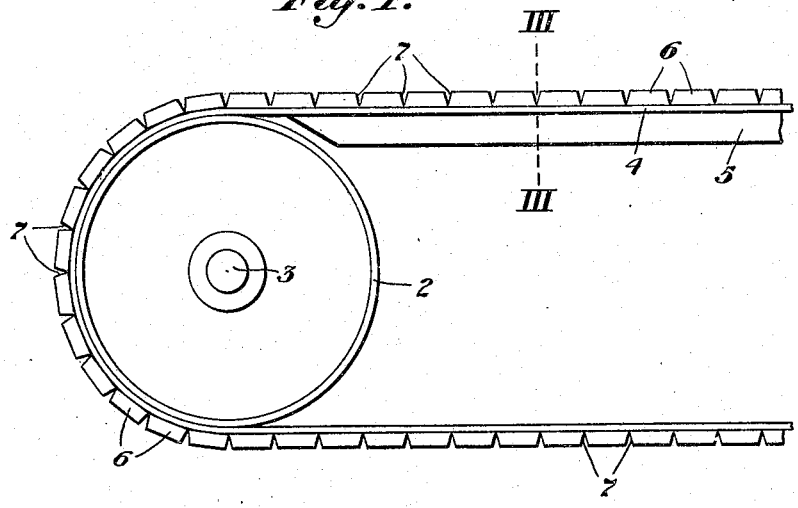
Figure 2:
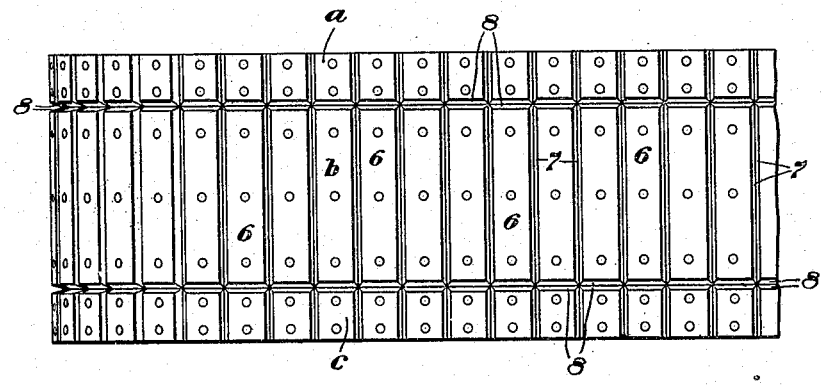
Figure 3:
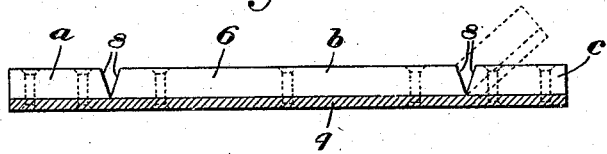

Referring to the drawings:—Figure 1 is a view in elevation of a portion of a conveyer and one of the carrying or driving pulleys, constructed in accordance with our invention. Fig. 2 is a plan view of Fig. 1. Fig. 3 is a cross sectional view on an enlarged scale, indicated by the line III. III. of Fig. 1.

2 represents one of two driving or supporting pulleys or drums mounted upon its supporting shaft 3 and driven by any suitable gearing for the purpose of imparting motion to the carrier.

4 represents a flexible base consisting of 
an endless belt of any suitable material, as leather, canvas, woven wire, etc., which for the purpose of supporting the burden may travel along upon separate carrying rollers or sheaves, or upon a stationary supporting under platform 5, as will be readily understood.

The elements constituting the contacting supports for the material to be carried, consist of a series of facing shoes or treads 6 of asbestos board, indurated fiber, or other suitable fireproof material, of sufficient strength and density to withstand the rough usage and friction of the material to be carried, said treads being secured to the flexible base 4 by bolts or rivets or other suitable means.

As indicated, these treads are made in narrow sections extending transversely of the base 4 having their meeting edges chamfered or beveled as indicated at 7, to insure free action in passing around the pulleys and permitting dust, etc., to fall out of the joints as they open, although good results may be had by having the treads abut against each other longitudinally of the conveyer.

For the purpose of providing for lateral flexibility, as when the conveyer is carried along through a supporting trough, for the purpose of conveying loose material in bulk, without side walls, each tread preferably consists of three separate sections $a$, $b$, and $c$, the adjacent ends of which are similarly chamfered or beveled, as indicated at 8, such construction being essential to permit of the up-bending of the end sections $a$ and $c$, as indicated in Fig. 3, when the conveyer is used in the manner indicated. It will also be understood that more than three sections may thus be arranged transversely of the belt to provide for a greater number of flexible joints and the invention is not limited in this respect to any particular number or arrangement of the parts.

As thus constructed, the conveyer may be used with hot material as stated, for a very considerable period of time without affecting its efficiency, in fact until the treads have been almost completely worn away or until the flexible base is exposed. The treads may then be renewed as desired at inconsiderable expense and without delay.

The advantages of the invention arise from its heat resisting qualities, its flexibility and adaptation to the uses suggested, the facility for cleaning by the opening of the joints, and will be found to provide a simple and efficient means for the purpose in view, while capable of long continued use and manufacture and maintenance at low cost.

Having described the invention, what we claim is:—

1. A conveyer consisting of a flexible base provided with a series of closely adjacent non-combustible treads secured thereon, said treads being divided transversely and longitudinally of the base, substantially as set forth.

2. In a conveyer, the combination of a flexible base, and a series of closely adjacent transverse sectional treads secured thereon, and having their adjacent edges beveled for clearance, substantially as set forth.

In testimony whereof we affix our signatures in presence of two witnesses.

HARVEY CORY.
EDMUND P. DANDRIDGE.

Witnesses:
C. M. CLARKE,
HENRY SENS.